July 2, 1968   E. H. WININGER   3,390,665
AQUARIUM WATERFALL
Filed Aug. 8, 1966
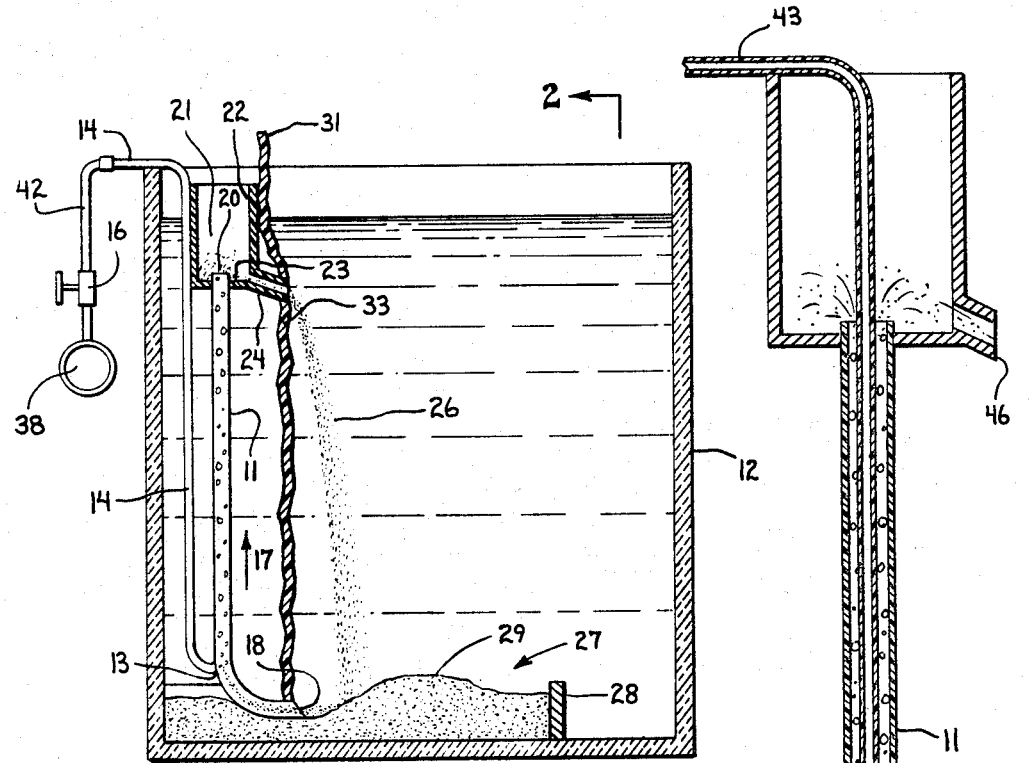
Fig. 1.
Fig. 3.
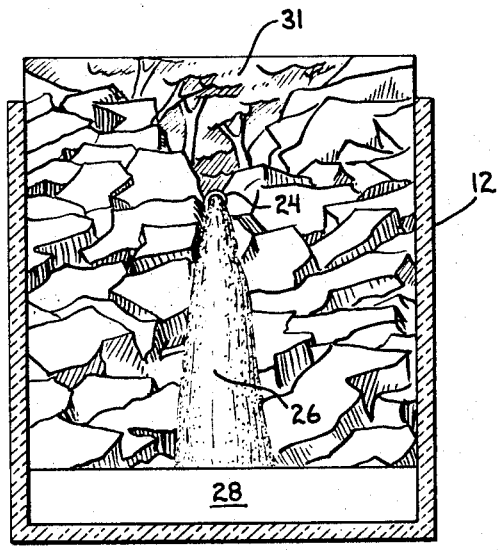
Fig. 2.
INVENTOR.
ELSWORTH H. WININGER
BY Woodard, Weikart, Emhardt & Naughton
Attorneys

United States Patent Office 3,390,665
Patented July 2, 1968

3,390,665
AQUARIUM WATERFALL
Elsworth H. Wininger, Indianapolis, Ind., assignor to Jerome H. Lucey, Indianapolis, Ind.
Filed Aug. 8, 1966, Ser. No. 570,783
10 Claims. (Cl. 119—5)

This invention relates generally to aquariums and more particularly to apparatus simulating a waterfall in an aquarium.

In the past, efforts have been made to add to or improve the appearance of aquariums in various ways. Such efforts have resulted in the addition of decorative objects of all types to aquariums. Some of the more elaborate arrangements include rock formations and it has been found that rock formations can be simulated by the use of various decorative materials. It occurred to me that still greater beauty and interest could be had in an aquarium if a waterfall were included in a rock formation. However, this presented the question of how to obtain a waterfall under water in an aquarium and furthermore how it could be done realistically and yet inexpensively enough that anyone who wishes to do so can have such a waterfall in an aquarium, regardless of how small the aquarium might be, so as to be within the reach of everyone who has an aquarium although the aquarium might be as small as a fishbowl.

It is therefore a general object of the present invention to provide a new decorative and interest feature for aquariums.

A further object is to provide apparatus simulating a waterfall in an aquarium.

A further object is to provide apparatus of extremely simple and reliable construction adapted to a variety of environments in an aquarium and capable of simulating a waterfall in an aquarium.

A further object is to provide apparatus produceable at such a low cost as to be within the reach of practically everyone who has an aquarium of practically any size at all.

Subsequent to my invention and prior to this application, investigation revealed a Patent No. 3,057,094 to Winkelman intended to simulate a waterfall in an aquarium. Because my invention produces so much more realistic results in a greater variety of environments and with considerably less complexity and expense, I believe it is a great improvement over the Winkelman device and that people should know about my invention and that I should have a patent for it. Described briefly, my invention includes a vertically extending tube having a cup at the upper end thereof and having its lower end curved to a horizontal inlet. This unit is mounted is an aquarium with the lower end opening in a pit of white sand and the upper end of the cup extending above the upper surface of the water. An air supply tube opens into the vertical tube near the lower end and air is supplied through a valve so that the air bubbles up through the vertical tube and draws water into the tube from the sand pit. Sand particles are dragged along with the water, carried up through the tube and discharged from a spout in the cup. The discharged sand falls in a natural path to the pit and presents the appearance of a waterfall. The path of the waterfall depends upon the rate of flow of air, controlled by the valve.

The full nature of the invention will be understood from the accompanying drawings and the following description and claims.

FIGURE 1 is a cross section through an aquarium apparatus showing one embodiment of the invention.

FIGURE 2 is a cross section through the apparatus of FIGURE 1 taken at line 2—2 in FIGURE 1 and viewed in the direction of the arrows.

FIGURE 3 is an enlarged cross section through the air supply and sand riser tube of a second embodiment.

Referring now to the drawings in detail, in one embodiment of the invention an upstanding tube 11 is mounted in the aquarium 12 and has an air inlet 13 joining it so that the air entering the tube 14 through valve 16 discharges into the tube 11 in the upward direction as indicated by the arrow 17. The upward flow of air bubbles draws water in through the inlet 18 of the tube 11 to induce circulation of water from the inlet 18 up through the tube 11 and out through the top of the tube at 20 into the chamber 21. Chamber 21 is provided by the upwardly opening cup 22 secured to the upper end of the tube 11 which projects slightly upwardly therein through the bottom thereof. This enables some sand particles to accumulate at 23 and they are discharged through the spout 24 along with the water which has come up into the chamber through the tube 11. The rate of water and sand flow is naturally dependent upon the air flow and can be varied from a point where there is no flow at all to the point where there is a rather rapid flow of water and sand. Thus the sand can fall practically vertically from the outlet of the spout at extremely low flows or can be discharged a substantial horizontal distance from the spout as indicated at 26. In either case, however, the sand falls into a sand reservoir 27 which can be bordered or confined if desired by a wall 28, although this is not essential. The sand will deposit from the spout to form a slight mound 29 and the inlet 18 is at the surface of the sand near the bottom of the mound so that the sand being discharged onto the mound will move down to the inlet 18 and move up again through the tube. Thus a continuous circulation of sand through the tube 11, receiver cup 22 and aquarium 12 to the reservoir 27 is provided. There is no obstruction at all to the natural fall of the sand from the spout to the pit so that the simulation of a natural waterfall is extremely realistic. Lighting can be provided to better display the falling sand, if desired.

It may be desirable to provide a simulated rock formation in the form of a three-dimensional plastic board 31 having an opening therein receiving the spout 24 but obscuring it from view so that the waterfall appears to be discharging from a crevice or niche 33 formed in the plastic board. The opening in the board at 36 provides means through which water from the aquarium and sand from the mound can enter the inlet opening in the tube 11.

The usual source of air provided for the invention is an electrically operated air pump 38 of the type readily avialable in aerators for aquariums.

In the other embodiment of the present invention, instead of the air being supplied by the external tube 14 of the earlier described embodiment, the air supply tube 41 extends down through the center of the sand riser tube 11 thus making a more compact construction. Like the earlier embodiment, the air can be provided by hose 42 extending from the valve 16 onto the inlet of the tube 41 at 43. In this embodiment, although the air outlet opening of the air tube at 44 points downwardly, the net effect of the difference in density between air and water and the resulting upward flow of air through the tube causes the induction of water through the inlet 18 drawing the sand in as with the previously described embodiment. In this embodiment as in the embodiment of FIGURE 1, it is desirable that the outer end of the bottom of the spout at 46 be in nearly vertical alignment with the outer end 47 at the top of the inlet 18. This enables circulation of sand even at such low air flows that the sand falls straight down from the spout.

From the foregoing description, it is believed apparent that the present invention makes possible a variety of installations at a very minimal cost using equipment already available to the average person or establishment having an aquarium. Commercially available fine white sand may be used in the practice of the invention, and other materials not soluble in water might also be used, if desired. Moreover, the fact that the air bubbles are discharged in the cup and behind the plastic simulated rock screen panel 31 avoids any disturbance in the aquarium and also minimizes noise.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. Apparatus simulating a waterfall in an aquarium and comprising:
   an aquarium including a liquid and solid particles;
   a first tube extending upwardly in the aquarium and sized to sustain an upward flow of gas, liquid, and solid particles therethrough simultaneously, said first tube having an inlet opening therein and an outlet opening at an elevation higher than said inlet opening;
   means introducing gas into said first tube at a point between said inlet opening and said outlet opening;
   an open reservoir of solid particles in the aquarium, said inlet opening being disposed in said reservoir at an upper surface of said particles and constituting a means for educting liquid and solid particles therethrough;
   a tube discharge receiver adjacent said outlet opening and having a discharge spout arranged to discharge said liquid and particles openly into said aquarium and thereby cause the liquid discharged through said spout to commingle and mix directly with the aquarium liquid and enable the discharged particles to fall by gravity in a natural waterfall path through said aquarium liquid to a location in said reservoir determined by the velocity, direction and angle of discharge from said spout.

2. The apparatus of claim 1 wherein said gas introducing means include a second tube extending through the liquid of said aquarium and opening upwardly into said first tube and discharging gas upwardly into said first tube.

3. The apparatus of claim 1 wherein said gas introducing means include a second tube extending into said outlet opening and downward therefrom inside said first tube to said point substantially below said outlet, and said second tube opening at said point to initiate upward travel of gas expelled from said second tube opening and enable substantial upward travel of gas bubbles through said first tube to said outlet opening thereof to induce flow of liquid and said particles from said reservoir up through said first tube and out the said outlet opening thereof.

4. The apparatus of claim 1 wherein said first tube includes a curved portion beginning at said inlet opening and extending therefrom and then curving upwardly toward said point to facilitate flow of said particles into and through said tube from said reservoir.

5. The apparatus of claim 1 wherein said discharge receiver is an upwardly opening cup open at the top.

6. The apparatus of claim 5 wherein said cup is partially submerged in the liquid in said aquarium and the open upper end of said cup is disposed above the free surface of the liquid in said aquarium, said apparatus excluding stationary means tangible by particles falling from said spout to said reservoir.

7. The apparatus of claim 1 wherein said outlet opening of said first tube is an open upper end of said first tube and said discharge receiver has a bottom, said first tube projecting up into said receiver to a point spaced above the bottom thereof, said receiver being constructed to preclude storage of gas therein, said apparatus further comprising a decorative board mounted in said aquarium and obscuring said tubes and receiver from view and having openings therein permitting flow of said particles from said spout out in front of said board and permitting flow of sand and liquid from said reservoir back into said first tube and then behind said board.

8. The apparatus of claim 1 wherein said gas introducing means include a pump pumping air into said first tube and valve means controlling rate of air flow into said first tube.

9. Waterfall apparatus for an aquarium containing sand and water and comprising:
   an upwardly opening cup having an outlet spout near the bottom thereof;
   a first elongated tube attached to the bottom of said cup and having an open upper end opening into said cup, said tube extending straight downward from said cup and then curving outward to a portion extending substantially horizontally and thereupon terminating at an open lower end of said first tube;
   a second elongated tube extending with said first tube and having a lower outlet opening end in said first tube at a point which is nearer the lower end of said first tube than it is to the upper end of said first tube, said second tube having an upper end adapted for connection to aquarium aerating supply means, said terminal open end of said first tube comprising a means for educting sand and water through said first tube into said cup and out into the aquarium water in the form of a waterfall.

10. Apparatus of claim 9 wherein said spout has an outer end in substantially vertical alignment with a point at the open lower end of said first tube.

References Cited

UNITED STATES PATENTS

| | | | |
|---|---|---|---|
| 2,491,853 | 12/1949 | Feldman | 119—5 |
| 2,676,921 | 4/1954 | Vansteenkiste | 210—16 |
| 2,730,496 | 1/1956 | Zavod | 210—16 |
| 2,820,548 | 1/1958 | Marcus et al. | 210—169 |
| 2,956,507 | 10/1960 | Hutchinson | 119—5 X |
| 3,057,094 | 10/1962 | Winkelman | 119—5 X |
| 3,059,091 | 10/1962 | Wenzel | 119—5 |
| 3,095,852 | 7/1963 | Goldman | 119—3 |
| 3,121,417 | 2/1964 | Goldman et al. | 119—5 |
| 3,149,608 | 9/1964 | Murphy | 119—5 |
| 3,151,069 | 9/1964 | Halpert | 210—169 |

ALDRICH F. MEDBERY, *Primary Examiner.*